United States Patent Office 3,246,997
Patented Apr. 19, 1966

3,246,997
PRINTING EMULSIONS
William G. Sumner, Chattanooga, Tenn., and Boardman Wright, Easton, Pa., assignors to General Aniline & Film Corporation, New York, N.Y., a corporation of Delaware
No Drawing. Filed May 9, 1961, Ser. No. 108,717
13 Claims. (Cl. 106—22)

This invention relates to a novel printing emulsion and more particularly to a novel printing emulsion of the oil-in-water type. The invention also relates to a novel printing process employing such emulsions.

In the usual printing methods applied to fibrous materials such as felted and woven fabrics, paper, and the like, the colorant is incorporated into an aqueous medium thickened to a suitable viscosity with standard thickening agents such as a gum and/or starch. These printing methods are characterized by a number of inherent disadvantages such as stiffness of hand of the finished print due to residual starch or gum, extra expense in removing as much residual starch or gum as possible, interference of the transfer of color from the printing paste to the fabric by the fairly high amounts of starch or gum required thereby resulting in poor color yields and/or poorly penetrated prints, incompatibility and/or instability of these printing compositions in the presence of certain types of dyestuffs, dye assistants and/or pH conditions, etc.

It has been previously proposed to eliminate such disadvantages by substituting all or most of the starch or gum with an oily bodying agent emulsified in the aqueous printing medium. While some of the previously proposed oil-in-water type printing emulsions are effective in certain instances and under certain conditions, they have uniformly been found to be unsatisfactory in being sensitive, incompatible and/or unstable in the presence of certain dyestuffs and/or the conditions required for printing same. As a result, different formulations of oil-in-water emulsions have been required for applying certain types of dyestuffs.

It is an object of this invention to provide an oil-in-water printing emulsion which will not be subject to the above disadvantages. Another object of this invention is the provision of an oil-in-water printing emulsion which is stable to and unaffected by different types of dyestuffs, varying conditions of pH, and/or other materials and/or conditions required for printing such dyestuffs. A still further object of this invention is the provision of a universal type of oil-in-water printing emulsion to which may be safely added any one of a number of different types of dyestuffs. Other objects and advantages will appear as the description proceeds.

The attainment of the above objects is made possible by the present invention which is based upon the discovery that most or all of the above described deficiencies may be overcome by employing as emulsifying agent in the aqueous phase of the known oil-in-water printing emulsions the reaction product of one mole of $P_2O_5$ with 2.0 to 4.5 moles of a nonionic surface active agent selected from the group consisting of polyoxyalkylene ethers of alkyl phenols and aliphatic alcohols of at least 8 carbon atoms, said oxyalkylene groups containing 2 to 4 carbon atoms each. The resulting emulsions have been found to improve upon, or eliminate disadvantages of, previously employed gum and/or starch printing pastes, yielding better penetration of the printed material, a softer hand, greater color yield, etc. Further, the emulsions of the present invention are stable to and compatible with a wide range of organic colorants and conditions required for applying same, as for example widely varying acidic and basic conditions of pH, oxidizing agents, reducing agents, hydrolyzing agents, azo coupling conditions, etc. It is thus made possible for the printer to keep in stock one basic type of oil-in-water emulsion to which may be safely added any one of a wide variety of organic colorants as desired for any particular dyeing operation. Such emulsions are stable in storage with or without inclusion of the organic colorant.

The emulsions of the present invention, and methods for their production are generally known and conventional, the only difference being that the previously employed emulsifying agents such as sodium lignin sulfonate and various other anionic and nonionic surface active agents used for the emulsification are replaced by the above defined phosphate ester reaction product.

The internal oil phase serves merely to body the emulsion, that is to provide and control the viscosity of the finished print paste. A wide variety of water insoluble, non-saponifiable, volatilizable hydrocarbon oils may be employed, of the type previously used in making such O/W printing emulsions. The hydrocarbon oil may be aliphatic, aromatic or naphthenic, or any mixture thereof including, for example, kerosene, toluene, xylenes, Varsol No. 1 (petroleum hydrocarbon oil, approximately 15% aromatics, 5% olefins and 80% saturated hydrocarbons), Varsol No. 2, Shell mineral spirits #8181, etc. The more fluid petroleum products are preferred by reason of their low viscosity, availability, cost, and relatively high volatility. They should preferably boil within a range of 100 to 400° C. and have a relatively low viscosity of less than 10 cps. (centipoises), preferably less than 5 cps., as measured on the Brookfield viscosimeter. The amount of oil (internal oil phase) employed in these emulsions may be varied depending upon the desired viscosity of the printing paste or emulsion, higher viscosities being obtained with increased proportions of oil in the emulsion. Generally, the internal oil phase will comprise about 15 to 80% of the emulsion. The viscosity of the printing paste or emulsion is of course determined by such factors as the type of printing equipment employed, the surface to be printed, the nature of the pattern, and the like. The printing paste viscosity may accordingly range from less than 10 poises to as much as 100 to 500 poises.

The external or aqueous phase of the emulsion serves as the solvent or carrier for the organic colorant, the improved emulsifying agent of the present invention, and, desirably, thickening agent, protective colloid, and other printing assistants, swelling agents for the material being printed, and the like.

The above defined reaction production of 1 mole of $P_2O_5$ with 2 to 4.5 moles of nonionic polyoxyalkylene ether of an alkyl phenol or aliphatic alcohol of at least 8 carbon atoms employed as the essential emulsifying agent herein may be prepared by the process described and claimed in the copending applications of Nunn and Hesse, Serial No. 852,188, filed November 12, 1959, now U.S. Patent 3,004,056, and of Nunn, Serial No. 856,-367, filed December 1, 1959, now U.S. Patent 3,004,057. As described in the said Nunn and Hesse application the reaction between the $P_2O_5$ and the nonionic polyoxyalkylene ether is conducted under substantially anhydrous conditions and at a temperature below about 110° C. In its perferred form, the reaction is carried out by adding the $P_2O_5$ gradually, with vigorous agitation to the nonionic surface active agent in liquid form. The reaction is exothermic and cooling is in some cases necessary to keep the temperature below 110° C., since discolored and darkened products tend to be produced above this temperature. The reaction proceeds continuously during the addition of the $P_2O_5$ and is preferably followed by maintenance of the reaction mixture at ambient temperatures up to 110° C. for an additional period of time after completion of such addition to allow for complete solution of the P₂O₅ and reaction with the nonionic surface active agent.

The exact chemical constitution of the products produced by the above described reaction is not definitely known in view of the recognized tendency of the P₂O₅ to form complex products and polymers in such reactions with hydroxylic compounds. In general, the product will usually contain about 20 to 45% of the secondary phosphate ester of the nonionic agent, 30 to 80% of the primary phosphate ester, 0 to 40% of unreacted nonionic agent, and small amounts of unidentified by-products.

By carrying out the reaction in the presence of a small amount of a phosphorus-containing compound selected from the group consisting of hypophosphorous acid, salts of hypophosphorous acid, phosphorous acid, and salts and esters of phosphorous acid, preferably sodium hypophosphite or hypophosphorous acid, as described in said Nunn application, Serial No. 856,367, lighter colored or substantially colorless reaction products are obtained.

The nonionic polyoxyalkylene ethers employed for reaction with P₂O₅ are well known in the art and are disclosed with suitable methods for their preparation in numerous patents and other publications. In general, they may be obtained by condensing a polyglycol ether containing the required number of alkenoxy groups or an alkylene oxide such as propylene oxide, butylene oxide, or preferably ethylene oxide or mixes thereof, with an alkyl phenol or aliphatic alcohol of at least 8 carbon atoms and up to 80 carbon atoms or more. The amount of alkylene oxide or equivalent condensed with the alkyl phenol or alcohol, i.e. the length of the polyoxyalkylene chain, and will depend upon the particular alkyl phenol or alcohol employed and the properties desired in the resulting emulsifying agent. Thus, the polyoxyalkylene ether may contain from 2 to 200 or more oxyalkylene groups.

Alkyl phenols may be employed as precursors for such polyoxyalkylene ethers containing 1 to 3 alkyl substituents of from about 4 to 20 carbon atoms each. Some examples of such compounds are the normal and isomeric mono-, di-, and tri-butyl, -nonyl, and -octadecyl phenols and cresols, and such phenols and cresols substituted by a plurality of different such alkyl groups.

The aliphatic alcohols employed as precursors for such polyoxyalkylene ethers may be straight or branched chain, saturated or unsaturated, primary, secondary or tertiary monohydric alcohols of natural or synthetic origin. Among this group are the alcohols derived from animal and vegetable sources such as lauryl alcohol, oleyl alcohol, stearyl alcohol, and the like. Primary, secondary or tertiary alcohols containing a plurality of side chains may be employed although the primary alcohols of this type are preferred as obtained for example by the Oxo process from a polyolefin containing at least 7 carbon atoms and at least two side chains, such as tripropylene, tetrapropylene, pentapropylene, diisobutylene, triisobutylene, and the like. The Oxo process involves the catalytic reaction of the olefin with carbon monoxide and hydrogen to form an aldehyde followed by catalytic reduction of the aldehyde to the corresponding primary alcohol which thus contains one more carbon atom than the olefin and one more side chain. Other operative alcohols employed as precursors are the essential straight chain alcohols produced from Fischer-Tropsch olefins by the Oxo process or those produced by oxidation of Ziegler type polymer intermediates. Such intermediates, or mixtures thereof made by polymerizing ethylene with a metal (e.g. aluminum) alkyl, have an even number of carbon atoms averaging 10 to 24 per molecule.

The reaction between the alkyl phenol or alcohol and the oxyalkylenating agent to produce the nonionic agent to be reacted with P₂O₅ is well known in the art, preferably involving use of elevated temperatures and pressures, and alkaline catalysts such as KOH or NaOH. The product of this reaction is a mixture of polyoxyalkylenated derivatives of varying oxyalkylene chain length, the average of which substantially corresponds to the amount of oxyalkylenating agent (e.g. ethylene oxide, etc.). The resulting polyoxyalkylene ethers may also be defined as polyglycol monoethers of alkyl phenols and alcohols of the types defined above.

The following is an illustrative, non-limitative list of some specific examples of suitable nonionic surface active agents which may be reacted with P₂O₅ to produce the presently employed emulsifying agents. In this list, "E.O." means "ethylene oxide" and the number beneath same refers to the number of moles thereof reacted with one mole of the given alkyl phenol or alcohol.

| Alkyl phenol or alcohol: | E.O. |
|---|---|
| Nonylphenol | 9–11 |
| Nonylphenol | 50 |
| Nonylphenol | 150 |
| Butylphenol | 2 |
| Dinonylphenol | 7 |
| Dinonylphenol | 100 |
| Dodecylphenol | 18 |
| Dodecylphenol | 70 |
| Trinonylphenol | 40 |
| Trinonylphenol | 200 |
| Trioctadecylphenol | 150 |
| Oleyl alcohol | 18 |
| Lauryl alcohol | 4 |
| Lauryl alcohol | 15 |
| Hexadecyl alcohol | 12 |
| Hexadecyl alcohol | 40 |
| Octadecyl alcohol | 50 |
| Oxotridecyl alcohol (from tetrapropylene) | 7 |
| Oxotridecyl alcohol (from tetrapropylene) | 15 |
| Oxotridecyl alcohol (from tetrapropylene) | 40 |
| Oxohexadecyl alcohol (from pentapropylene) | 50 |

Lower proportions of the nonionic surface active agent, e.g. 2 to 3.5 moles per mole of P₂O₅ result in phosphate ester emulsifying agents with increasing water solubility which may in some instances be desirable. It will be understood that the defined reaction products of P₂O₅ with nonionic surface active agent may be used in the form of the free acid or soluble salts thereof such as the alkali metal salts including sodium and potassium, and the like.

The amount of phosphate ester emulsifying agent to be employed in any particular instance is not of course capable of exact definition or delimitation, being dependent upon the proportion of oil to water phases in the emulsion, the chemical constitutions of the oil and water phases, the viscosity of the emulsion, etc. The optimum amount of emulsifying agent necessary in any particular instance for yielding a stable emulsion will be readily determinable by routine experimentation and may be defined as "an emulsifying amount." Generally, the emulsifying agent will be present in proportions of from about 0.01 to 3.0% in the emulsion.

As indicated above, a major advantage of the present invention is its effectiveness with almost every major type of organic colorant whereby the trade is provided with a universal type "all purpose" printing emulsion. As examples of the types of organic colorants, all of which should be water soluble or readily water dispersible in the aqueous phase in the presence of the defined emulsifying agent, there may be mentioned vat dyestuffs, i.e. dyestuffs of the anthraquinone, indigo, thioindigo, and sulphur series capable of being solubilized by reduction with alkaline hydrosulfite; stabilized water soluble forms of the vat dyestuffs, such as the leuco esters thereof; stabilized diazoaminoazoic coupling component mixtures; direct colors; acid colors; basic colors; dispersed colors (acetate type); oxidation colors; pigments; reactive dyes of various known types, such as disclosed in U.S. 2,895,785 and other patents, so-called because of their reactivity with the fibrous material being colored to yield colored products with increased fastness properties. These and other types of organic colorants which require the use of many different types of conditions, assistants and the like may be employed in the present emulsions. The proportion of colorant to be employed in any particular instance is not critical and will of course depend upon the depth of shade desired, etc.

The aqueous phase of the present printing emulsion generally, though not necessarily, contains a thickening agent and a protective colloid. Although it is often difficult to differentiate clearly between thickener and protective colloid, some compounds serving in both capacities, there may be mentioned as suitable thickeners for use in the present emulsions carboxymethyl cellulose, methyl cellulose, alginates, galactans such as gum tragacanth and particularly mannogalactans such as the various guar gums, polyacrylamides, and the like. They may be employed in proportions of about 0.01 to 2.0% in the printing paste or emulsion.

As representative protective colloids, there may be mentioned polyvinylpyrrolidone, gelatin, copolymers of maleic anhydride with vinyl methyl ether, styrene, and other ethylenically unsaturated compounds in the form of free acids or the amides or esters of such copolymers, polyvinyl alcohol, and, preferably, soluble casein compounds such as ammonium caseinate. The protective colloid may be present in proportions of about 0.1 to 2.0% in the printing paste.

Other assistants may also be present in the emulsion including hygroscopic agents such as glycerin, diethylene glycol, ethylene glycol, 2-methyl-2,4-pentanediol, urea, preservatives, germicides, fungicides, or antiseptic agents such as Dowicide A (sodium o-phenylphenate), anthraquinone and other catalysts for discharge effects, formaldehyde sulfoxylate reducing agent, various electrolytes, etc.

It will of course be understood that in view of the "all purpose" character of the present emulsions, they are especially adapted for distribution, sale and/or storage in the form of an emulsion clear to which the printer or dyer may add the desired organic colorant when needed. It will also be understood that the present emulsions may be employed for obtaining pattern or overall effects and may be applied by screen printing, block printing, roller printing, or by cover pad printing, pin pad or padding methods on to a fabric or length of fibrous material which may or may not carry a resist in a suitable pattern thereon. The present emulsions have been found to yield excellent results when employed in the flash-aging method involving printing a vat pigment, wet padding the printed fabric with reducer, treating the padded fabric in a flashager with steam for 50 seconds or less, subjecting the aged fabric to oxidation and then washing and drying. When such vat pigments are applied in the aqueous phase of the present emulsions, the usual tendency to bleed during the wet padding and oxidation steps is minimized or eliminated. The present emulsions likewise lend themselves admirably to use in continuous screen printing methods without the usual tendency of marking off.

The emulsions of this invention may be prepared in known manner employing any desired order and/or method of mixing of components, emulsifications, etc. Subsequent treatment of the fibrous material carrying such emulsions will of course depend in large part upon the type of organic colorant in the emulsions since the colorant may require a fixation, developing, or similar treatment as by oxidation, hydrolysis, acidification, coupling, etc. Usually and preferably such subsequent treatment will include a washing step to remove excess water soluble components of the emulsion remaining in the material. To achieve maximum advantage from the present invention, these emulsions will generally contain a low content of total solids below 15% in the emulsion. Thus, such solids content will generally range from about 0.1 to 4.0% and preferably from about 0.1 to 1.5%. Further, such solids should include little or no substances yielding a water insoluble film on the fibrous material.

In the following examples, Emulsifier A was prepared by reaction of 1 mole of $P_2O_5$ with about 3 moles of the nonionic surface active condensation product of 1 mole of nonylphenol with 50 moles of ethylene oxide. The reaction between the $P_2O_5$ and the nonionic agent was carried out in the presence of sodium hypophosphite following the procedure described in the said Nunn application Serial No. 856,367. The resulting reaction product consisted essentially of about 10–15% residual unreacted nonionic surface active agent in addition to the primary and secondary phosphate esters thereof in approximately equal amounts. It will be understood however that other emulsifying agents of the type described above may be employed and that the following examples are only illustrative and are not to be regarded as limitative of the present invention. All parts and proportions referred to herein and in the appended claims are by weight unless otherwise indicated.

*Example 1*

A concentrated clear is prepared by adding 5 parts carboxymethyl cellulose high viscosity, 7 parts guar gum, and 5 parts Emulsifier A to 120 parts of a 10% aqueous solution of ammonium caseinate and mixing the combined ingredients by means of an Eppenbach homogenizer.

*Example 2*

A vat print paste is prepared by mixing 54 parts of the clear concentrate from Example 1 with 336 parts of water and then emulsifying into the resultant mixture 300 parts of hydrocarbon solvent (such as Varsol No. 2) by means of an homogenizer. Into this resultant emulsion are mixed 150 parts of sodium sulfoxylate-formaldehyde, 100 parts of anhydrous potassium carbonate and 60 parts sugar. To 900 parts of this vat print paste are added 100 parts of CI Vat Yellow 4, CI 59,100 (Indanthrene Golden Yellow GK Suprafix) with hand stirring which results in a well-bodied, smooth, oil-in-water emulsion. Prints made on 80 x 80 bleached cotton cloth with the above emulsion are strong, bright, clean and sharply defined. After ageing, oxidizing, soaping, and drying, the print from the emulsion compares very favorably with prints made using a conventional starch gum with the same color concentration.

*Example 3*

A print is made exactly as described in Example 2 except 100 parts CI Vat Blue 5, CI 73,065 (Brilliant Indigo 4B Ex. Dbl. Paste) are substituted for the CI Vat Yellow 4. The resulting print when dried, aged, oxidized, soaped, and dried is found to be as clean, bright, strong and sharply defined as prints made at the same color concentration using a conventional starch gum under the same conditions.

*Example 4*

Two parts carboxymethyl cellulose high viscosity and 2 parts guar gum are added to 459 parts water containing 12 parts ammonium caseinate and 10 parts Emulsifier A. The ingredients are mixed on an Eppenbach homogenizer until a smooth, light paste is obtained. 150 parts sodium sulfoxylate-formaldehyde and 100 parts anhydrous potassium carbonate are mixed in as above, then 265 parts hydrocarbon solvent (Varsol No. 2) are mixed in on the Eppenbach homogenizer resulting in a well bodied smooth O/W emulsion.

A print is made on 80 x 80 cotton cloth utilizing a print paste composed of 90 parts of the resultant emulsion and 10 parts CI Vat Yellow 4, CI 59,100, as described in Example 2 and with results as in Example 2.

*Example 5*

A print is made exactly as described in Example 4 except 10 parts CI Vat Blue 5, CI 73,065, are substituted for 10 parts CI Vat Yellow 4. A bright, clean, strong, and sharply defined print is obtained by this procedure.

*Example 6*

An emulsion concentrate is made by homogenizing 440 parts water and 135 parts clear concentrate from Example 1 until a smooth paste results. Into the resultant paste are homogenized 425 parts hydrocarbon solvent (Varsol No. 2) until a smooth, well-bodied O/W emulsion is obtained.

*Example 7*

A print is made on 80 x 80 cotton cloth utilizing a print paste of 82 parts O/W emulsion described in Example 6 into which is hand stirred 18 parts CI Azoic Red 1, CI 37,015 (Rapidogen Scarlet RS solution).

After drying, ageing, soaping, and drying, prints made by this procedure are as clean, strong, bright, and sharply defined as prints made as the same color concentration from standard starch gum paste finished by the same procedure.

*Example 8*

5 parts carboxymethyl cellulose high viscosity and 5 parts guar gum are added to 548 parts water containing 12 parts ammonium caseinate and 5 parts Emulsifier A and the ingredients are mixed on an Eppenbach homogenizer. 425 parts hydrocarbon solvent (Varsol No. 2) are mixed into the above until a well bodied, smooth O/W emulsion is formed.

To 82 parts of the resultant emulsion are added 18 parts CI Azoic Red 1 and prints are made on 80 x 80 cotton cloth as described in Example 7 with equally good results.

*Example 9*

To 50 parts O/W emulsion described in Example 6 are added 4 parts thiodiglycol (Glycene A), 4 parts urea, 33 parts $H_2O$, 1 part sodium chlorate, .02 part ammonium vanadate, 2 parts ammonia 28%, 2 parts gluconic acid, and 4 parts CI Solubilized Vat Yellow 4, CI 59,101 (Algosol Golden Yellow IGK–CF).

A print is made on 80 x 80 cotton cloth which is as bright, strong, clean, and sharply defined as a print made utilizing standard starch gum in place of the emulsion thickener. The cloths initially printed with the described emulsion or starch gum printing paste were subjected to the usual after treatment involving acid ageing, washing, etc.

*Example 10*

To 50 parts O/W emulsion described in Example 6 are added 3 parts thiodiglycol (Glycene A), 23.8 parts $H_2O$, 3 parts disodium phosphate, 20 parts urea, and 0.2 parts CI Direct Red 75, CI 25,380 (Fastusol Pink BBA–CF) with mixing.

Prints are made with the resultant print paste on 80 x 80 cotton cloth which after drying, ageing, soaping, rinsing and drying are as bright, strong, clean, and sharply defined as prints made utilizing standard starch gum instead of the emulsion thickener.

*Example 11*

Into 50 g. O/W emulsion described in Example 6 are mixed 3 parts thiodiglycol, 3 parts glycerine, 35 parts $H_2O$, 1.5 parts ammonium sulfocyanide, 5 parts urea, and 2 parts CI Acid Red 99, CI 23,285 (Supranol Red PRX–CF).

Prints are obtained with this mixture on chlorinated wool which after drying, ageing, soaping, rinsing, and drying are as strong, bright, clean and sharply defined as prints obtained utilizing standard starch gum instead of the emulsion thickener.

*Example 12*

Into 50 parts O/W emulsion described in Example 6 are added 3 parts thiodiglycol, 43 parts $H_2O$, 2 parts ammonium sulfate, and 2 parts Genacryl Pink, G, CI Basic Red 13, CI 48,015.

Prints are obtained on Orlon with this mixture which after drying, ageing, soaping, rinsing, and drying are as strong, clean, bright and sharply defined as prints obtained utilizing standard starch gum instead of the emulsion thickener.

*Example 13*

Into 50 parts O/W emulsion described in Example 6 are added 3 parts sulfonated castor oil (Monopole Oil 48), 5 parts urea, 39 parts water, and 3 parts CI Disperse Blue 1, CI 64,500 (Celliton Blue BB Ex. Conc. for printing).

Prints are made with the above on acetate rayon which after drying, aging, soaping, rinsing, and drying are as strong, bright, clean and sharply defined as prints obtained in utilizing standard starch gum instead of the emulsion thickener.

*Example 14*

Into 50 parts O/W emulsion described in Example 6 are added 33 parts hot water, 12 parts urea, 2 parts sodium bicarbonate, and 4 parts of the reactive blue dyestuff described in Example 31 of U.S. 2,670,265.

Prints are made with the above on 80 x 80 cotton cloth which after drying, aging, soaping, rinsing, and drying are as bright, clean, strong and sharply defined as prints obtained utilizing standard sodium alginate thickener instead of the emulsion thickener.

*Example 15*

88 parts aniline hydrochloride are mixed with 100 parts $H_2O$ as Component A. 35 parts sodium chlorate are mixed with 100 parts $H_2O$ as Component B. 500 parts O/W emulsion described in Example 6 are mixed with 100 parts $H_2O$ and 65 parts potassium ferrocyanide as Component C. Components A, B, and C are mixed together into a smooth, well-bodied print paste.

Prints are obtained on 80 x 80 cotton cloth which after aging, oxidizing, rinsing, soaping, rinsing, and drying are as clean, bright, strong, and sharply defined as prints obtained utilizing standard starch gum instead of the emulsion thickener.

It will of course be understood that the above described prints produced by use of this invention are in all cases superior in hand, flexibility, etc. as compared with the comparable prints produced with known thickeners such as starch gum, sodium alginate, etc. The invention has been disclosed with respect to certain preferred embodiments and various modifications and variations thereof obvious to those skilled in the art are intended to be included within the spirit and purview of this invention and the scope of the appended claims.

We claim:
1. A stable oil-in-water color printing emulsion the oil phase of which consists essentially of a volatilizable hydrocarbon oil boiling within the range of 100 to 400° C. and the aqueous phase of which contains an at least readily water dispersible organic colorant and as emulsifying agent the reaction product of 1 mole of $P_2O_5$ with 2 to 4.5 moles of a nonionic surface active agent selected from the group consisting of polyoxyalkylene ethers of alkyl phenols and aliphatic alcohols of at least 8 carbon atoms, said oxyalkylene groups containing 2 to 4 carbon atoms each.

2. An emulsion as defined in claim 1 wherein said oxyalkylene groups are oxyethylene groups.

3. An emulsion as defined in claim 1 wherein said nonionic surface active agent is a polyoxyethylene ether of an alkyl phenol.

4. An emulsion as defined in claim 1 wherein said nonionic surface active agent is the condensation product of one mole of nonyl phenol with about 50 moles of ethylene oxide.

5. A stable oil-in-water color printing emulsion the oil phase of which consists essentially of a volatilizable hydrocarbon oil boiling within the range of 100 to 400° C. and the aqueous phase of which contains an at least readily water dispersible organic colorant, about 0.01 to 2.0% of a printing thickener of natural origin, about 0.1 to 2.0% of a protective colloid, and as emulsifying agent the reaction product of one mole of $P_2O_5$ with 2 to 4.5 moles of a nonionic surface active agent selected from the group consisting of polyoxyalkylene ethers of alkyl phenols and aliphatic alcohols of at least 8 carbon atoms, said oxyalkylene groups containing 2 to 4 carbon atoms each.

6. An emulsion as defined in claim 5 wherein said oxyalkylene groups are oxyethylene groups.

7. An emulsion as defined in claim 5 wherein said nonionic surface active agent is a polyoxyethylene ether of an alkyl phenol.

8. An emulsion as defined in claim 5 wherein said nonionic surface active agent is the condensation product of one mole of nonyl phenol with about 50 moles of ethylene oxide.

9. An emulsion as defined in claim 5 wherein said protective colloid is ammonium caseinate.

10. A method which comprises printing fibrous material with an emulsion as defined in claim 1, drying the printed fibrous material, and washing out excess remaining water soluble components of the printing emulsion.

11. A method which comprises printing fibrous material with an emulsion as defined in claim 2, drying the printed fibrous material, and washing out excess remaining water soluble components of the printing emulsion.

12. A method which comprises printing fibrous material with an emulsion as defined in claim 3, drying the printed fibrous material, and washing out excess remaining water soluble components of the printing emulsion.

13. A method which comprises printing fibrous material with an emulsion as defined in claim 4, drying the printed fibrous material, and washing out excess remaining water soluble components of the printing emulsion.

References Cited by the Examiner
UNITED STATES PATENTS

| | | | |
|---|---|---|---|
| 1,860,043 | 5/1932 | Ludwigsen | 106—32 |
| 2,090,704 | 8/1937 | Rowell | 106—24 |
| 2,637,705 | 5/1953 | Auer | 106—170 |
| 2,771,373 | 11/1956 | Chambers et al. | 106—24 |
| 2,772,175 | 11/1956 | Beatty et al. | 106—24 |
| 2,778,740 | 1/1957 | Sterling | 106—170 |
| 2,792,314 | 5/1957 | Brown | 106—170 |
| 2,884,332 | 4/1959 | Locher et al. | 106—26 |
| 2,976,163 | 3/1961 | Bitting et al. | 106—170 |
| 2,980,545 | 4/1961 | Shoemaker | 106—32 |
| 3,004,056 | 10/1961 | Nunn et al. | 260—461 |
| 3,004,057 | 10/1961 | Nunn | 106—170 |
| 3,019,105 | 1/1962 | Adams | 106—170 |

ALEXANDER H. BRODMERKEL, *Primary Examiner.*

JOHN R. SPECK, MORRIS LIEBMAN, *Examiners.*

UNITED STATES PATENT OFFICE
CERTIFICATE OF CORRECTION

Patent No. 3,246,997                                            April 19, 1966

William G. Sumner et al.

It is certified that error appears in the above identified patent and that said Letters Patent are hereby corrected as shown below:

Column 7, lines 43 and 58, "Glycene", each occurrence, should read -- Glyecine --. Column 8, line 18, "Monopole" should read -- Monopol --. Column 10, line 31, "3,019,105" should read -- 3,019,106 --.

Signed and sealed this 3rd day of March 1970.

(SEAL)
Attest:

Edward M. Fletcher, Jr.                           WILLIAM E. SCHUYLER, JR.
Attesting Officer                                        Commissioner of Patents